US008351077B2

(12) United States Patent
Nishide

(10) Patent No.: US 8,351,077 B2
(45) Date of Patent: Jan. 8, 2013

(54) INFORMATION PROCESSING APPARATUS, INFORMATION PROCESSING METHOD, COMPUTER-READABLE MEDIUM AND COMPUTER DATA SIGNAL

(75) Inventor: Yasushi Nishide, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 908 days.

(21) Appl. No.: 12/467,044

(22) Filed: May 15, 2009

(65) Prior Publication Data

US 2010/0149561 A1    Jun. 17, 2010

(30) Foreign Application Priority Data

Dec. 16, 2008   (JP) ................................ 2008-319723

(51) Int. Cl.
  *H04N 1/60*   (2006.01)
(52) U.S. Cl. ........................................ 358/1.9; 358/518
(58) Field of Classification Search .................. 358/1.9, 358/518, 520, 523; 382/162, 167
See application file for complete search history.

(56) References Cited

U.S. PATENT DOCUMENTS

| | | | | |
|---|---|---|---|---|
| 2006/0139668 A1* | 6/2006 | Nishikawa | ..................... | 358/1.9 |
| 2006/0232804 A1* | 10/2006 | Furukawa | ..................... | 358/1.9 |
| 2006/0285742 A1* | 12/2006 | Arai et al. | ..................... | 382/162 |
| 2012/0090488 A1* | 4/2012 | Postle et al. | .................. | 101/483 |

FOREIGN PATENT DOCUMENTS

JP    2006-155499 A    6/2006

* cited by examiner

*Primary Examiner* — Kimberly A Williams
(74) *Attorney, Agent, or Firm* — Sughrue Mion, PLLC

(57) ABSTRACT

An information processing apparatus includes a receiving unit, a search unit, a determination unit, a conversion unit and an output unit. The receiving unit receives a command for forming an image. The search unit searches for color designation information that designates specific color information and is included in the received command. The determination unit determines a type of the color information designated by the color designation information found by the search. The conversion unit converts the color designation information into information conforming to a common expression rule, based on a conversion rule that is set for each type of the color information. The output unit outputs the information obtained by the converting.

15 Claims, 6 Drawing Sheets

FIG. 3

```
           ⋮
set colorspace    ⋯

⋮
0   0        ⎫
more to      ⎬ B
72  72       ⎭
line to
           ⋮
setcolor    { ⋯        }   ← C₁

⋮
setcolor    { ⋯        }   ← C₂
altcolor      ⋯            ← D

| Search condition | Spot color type |
|---|---|
| Start with DIC | DIC |
| Start with CF | TOYO |
| Start with PANTONE | PANTONE |
| ⋮ | ⋮ |

INFORMATION PROCESSING APPARATUS, INFORMATION PROCESSING METHOD, COMPUTER-READABLE MEDIUM AND COMPUTER DATA SIGNAL

CROSS-REFERENCE TO RELATED APPLICATIONS

This application is based on and claims priority under 35 USC 119 from Japanese Patent Application No. 2008-319723 filed on Dec. 16, 2008.

BACKGROUND

Technical Field

The invention relates to an information processing apparatus, an information processing method, a computer-readable medium and a computer data signal.

SUMMARY

According to an aspect of the invention, an information processing apparatus includes a receiving unit, a search unit, a determination unit, a conversion unit and an output unit. The receiving unit receives a command for forming an image. The search unit searches for color designation information that designates specific color information and is included in the received command. The determination unit determines a type of the color information designated by the color designation information found by the search. The conversion unit converts the color designation information into information conforming to a common expression rule, based on a conversion rule that is set for each type of the color information. The output unit outputs the information obtained by the converting.

BRIEF DESCRIPTION OF THE DRAWINGS

Exemplary embodiments of the invention will be described below based on the accompanying drawings, wherein:

FIG. 3 is an explanatory view showing an example of a command for forming an image that is processed by the information processing apparatus according to the exemplary embodiment of the invention;

FIG. 4 is an explanatory view showing a spot color search condition that is stored in the information processing apparatus according to the exemplary embodiment of the invention;

DETAILED DESCRIPTION

Figure 1:
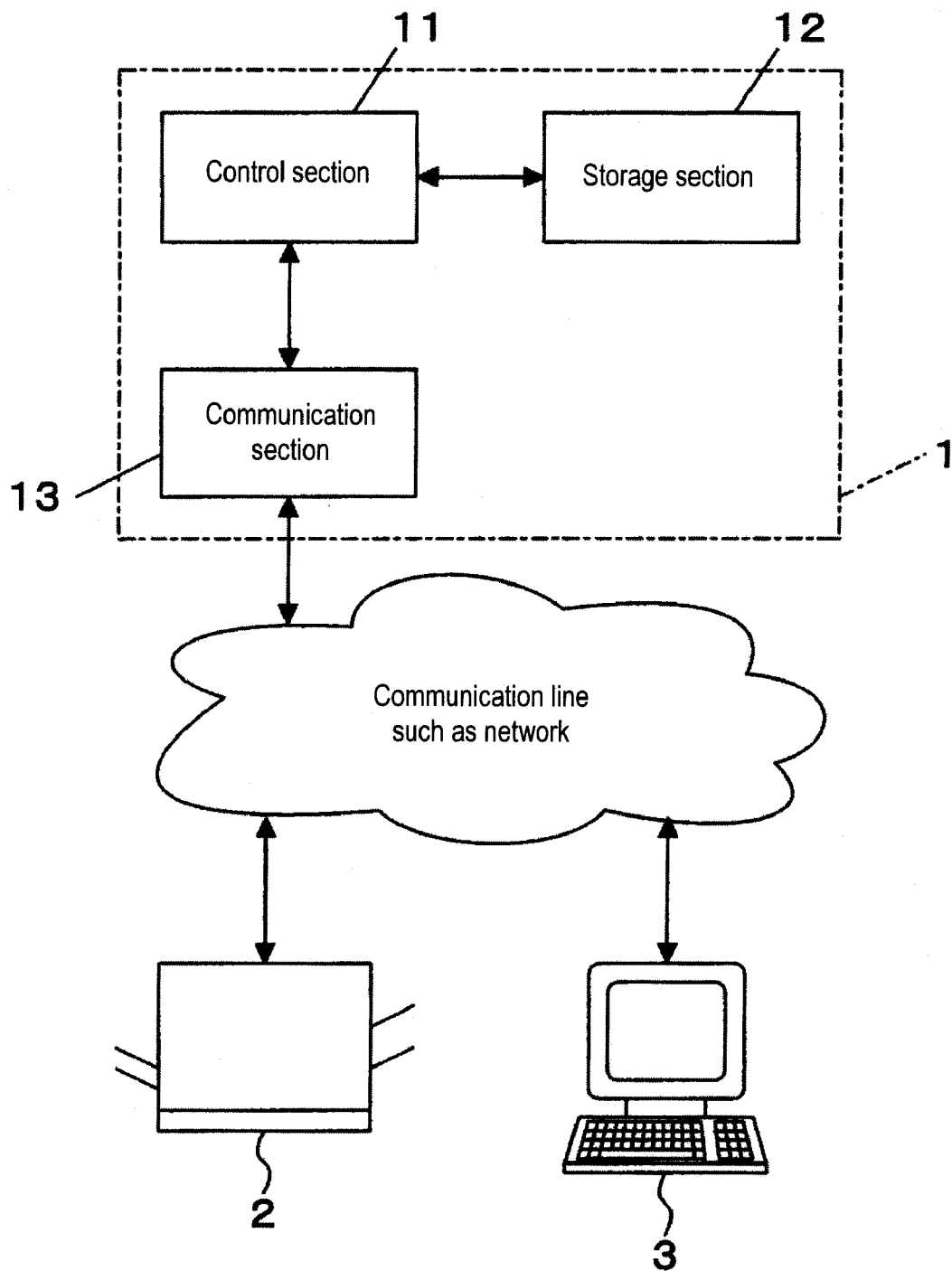
FIG. 1 is a block diagram showing a configuration example of an information processing apparatus according to an exemplary embodiment of the invention and a connection example thereof.

Exemplary embodiments of the invention will be described below with reference to the accompanying drawings. An information processing apparatus according to the exemplary embodiment includes, as illustrated in FIG. 1, a control section 11, a storage section 12 and a communication section 13. The information processing apparatus is connected to an image forming apparatus 2 such as a printer and a client device 3 through a communication line such as a network.

The image forming apparatus 2 accepts registration of information in which a name of a spot color is associated with information required to express the specific color (for example, a use quantity of each coloring material or an Lab value of the sport color when the spot color is simulated by process colors or the like), and executes a process of forming an image in accordance with an image formation command including designation of the spot, by using the registered information.

The control section 11 is a program control device such as a CPU (Central Processing Unit) and operates in accordance with a program stored in the storage section 12. The control section 11 of this exemplary embodiment receives the image formation command (command for forming an image), from the client device 3. Then, the control section 11 searches for color designation information that designates specific color information (spot color) and is included in the received command and determines a type of the spot color found by the search process. Here, the spot color is a color used for forming an image in addition to a process color (a color obtained by combining the coloring materials such as cyan, magenta, yellow, and black). There are various types of spot colors, for example, DIC (the spot colors provided by DIC Corporation), TOYO (the spot colors provided by Toyo Ink Mfg. Co., Ltd.), PANTONE (the spot colors provided by Pantone Corporation), etc. The control section 11 determines which of DIC, TOYO, PANTONE and the like the color designation information found by the search process designates (determines a spot color type).

Also, in the information processing apparatus 1 of this exemplary embodiment, a conversion rule is set for each spot color type. The conversion rule is used to convert the color designation information, which is used in the image formation command, into information conforming to a common expression rule. The control section 11 converts the color designation information found by the search process into information conforming to the common expression rule, in accordance with the conversion rule, which is set for a type of a spot color designated by the color designation information. Then, the control section 11 outputs the information (converted color designation information), which is obtained by the conversion process and conforms to the common expression rule, as information that designates a spot color to be used. A specific example of an operation of the control section 11 will be described later.

The storage section 12 is a memory device or the like. The storage section 12 stores the program executed by the control section 11. The program may be provided in a state where it is stored in a recording medium that can be read by a computer, such as a DVD-ROM (Digital Versatile Read Only Memory), and then be copied to the storage section 12. Also, the storage section 12 operates as a working memory of the control section 11. The communication section 13 is a network interface, and transmits and receives information to and from the image forming apparatus 2 and the client device 3 through a communication line such as a network.

Figure 2:
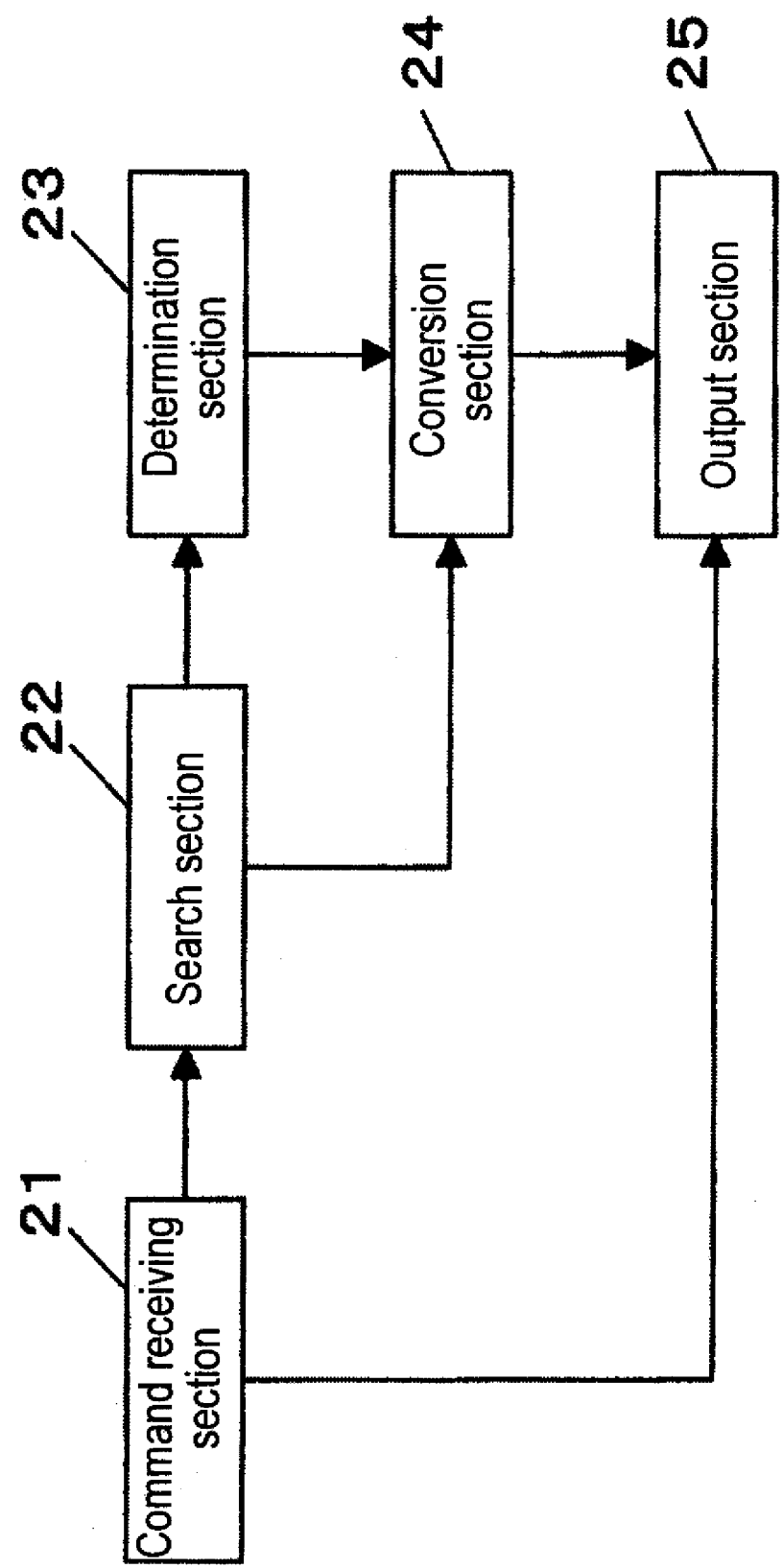
FIG. 2 is a functional block diagram showing an example of the information processing apparatus according to the exemplary embodiment of the invention.

Now, a specific process of the control section 11 will be described below. In this exemplary embodiment, the control section 11 of the information processing apparatus 1 functionally includes, as shown in FIG. 2, a command receiving section 21, a search section 22, a determination section 23, a conversion section 24 and an output section 25. Here, the command receiving section 21 receives the image formation command from the client device 3. The image formation command is information described in a page description language such as PostScript®. As shown in FIG. 3, the image formation command includes a drawing command (B) for drawing a figure or a character that is an image to be formed. Also, the image formation command includes a color space setting command (command for setting a color space; "set colorspace") and a color designation command (command for designating a color; "setcolor"). Here, the color designation command includes a command (C1) for designating a process color and a command (C2) for designating a spot color. Here, if the image formation command designates a spot color, the image formation command also includes information ((D); may be referred to as "substitute color information") about Lab values required to express the spot color or substitute CMYK values (information that defines a use quantity of a coloring material in the image forming apparatus). The command receiving section 21 stores the received image formation command in the storage section 12.

The search section 22 sets the image formation command stored in the storage section 12 as a process target, and searches the process target for the color designation information that designates the specific color information. Specifically, the search section 22 stores, in the storage section 12, at least one search condition that is used to search for the color designation information, which designates the specific color information. The search condition may be a condition relating to a character string in the color designation information, for example, the color designation information starts with "DIC", starts with "CF", starts with "PANTONE" or the like. Further, in this exemplary embodiment, each search condition and information about a type of a spot color designated by the color designation information, which is found based on each the search condition, (for example, any of the character strings of "DIC", "TOYO", and "PATONE") are stored in the storage section 12 in advance in association with each other (FIG. 4).

The search section 22 outputs the color designation information, which is found based on the designated search condition, and the information about the spot color type associated with the search condition based on which the color designation information is found. Also, the search section 22 obtains the color designation information, which is found based on the designated search condition, and the substitute color information included therein, and outputs the color designation information and the substitute color information to the output section 25.

The determination section 23 receives from the search section 22 the color designation information, which is found by the search process, and the information about the spot color type. Then, the determination section 23 determines that the color designation information, which is found by the search process, is of the type specified by the information about the spot color type, which is input together.

Upon receipt of the determination result made by the determination section 23, the conversion section 24 converts the respective pieces of color designation information in accordance with the conversion rules, which are defined in advance for the respective spot color types. A specific example of the conversion rule used herein is given below. That is, a person who sets the conversion rule examines in advance how spot colors of DIC, TOYO and PANTONE are respectively expressed in applications that he/she will use. For example, when the first spot color of "DIC" has plural notations such as DIC1$s$, DIC1$p$ and DIC1* in the respective applications, the conversion rule is defined so as to replace these notations by a notation represented based on the common expression rule. One example of this conversion rule is given below.

Step 1: Extract a part except for "DIC" at a top.
Step 2: Extract a numerical character(s) included in the extracted part.
Step 3: Concatenate a character string of "DIC" at the top extracted in the step 1, an under-bar (_) and the numerical character(s) extracted in the step 2.

According to this rule, all of DIC1$s$, DIC1$p$ and DIC1$s$* exemplified above are converted into a notation based on the common expression rule, that is, the notation of "DIC_1".

Similarly, in the case of TOYO, if a color number "CF10099" has either a notation of CF10099 or a notation of CF10099*, one example of the conversion rule is given below.

Step 1: If a character string has an asterisk mark (*) at its last part, delete the asterisk mark.
Step 2: Insert an under-bar (_) after an English character part.

According to this rule, both of CF10099 and CF10099* exemplified above are converted into a notation based on the common expression rule, that is, a notation of "CF_10099". Each conversion rule may be associated with the information about the corresponding spot color type kinds and stored in the storage section 12.

The output section 25 outputs the converted color designation information, which is obtained by the conversion operation of the conversion section 24. Specifically, the output section 25 registers the converted color designation information in the image forming apparatus 2 as designation of the spot color. Also, the output section 25 replaces the color designation information, which is found in the received image formation command by the search process of the search section 22, by the converted color designation information corresponding thereto, for output to the image forming apparatus 2.

Also, in this exemplary embodiment, the output section 25 associates the color designation information obtained by the conversion process of the conversion section 24 with the substitute color information input from the search section 22, and outputs the converted color designation information and the substitute color information to the image forming apparatus 2 to register the converted color designation information and the substitute color information in the image forming apparatus 2 in association with each other.

Even if no substitute color information is included in the image formation command, the color designation information based on the common expression rule may be associated with the substitute color information for representing the spot color designated by the color designation information may be stored in the storage section 12 in advance in association with each other. The output section 25 may output the converted color designation information and output the substitute color information associated with the output converted color designation information to the image forming apparatus 2 for registration.

The image forming apparatus 2 receives the converted color designation information, which is input as the designation of the spot color, and uses the received color designation information to execute a process for forming an image. Specifically, when a substitute color is designated in association with the received converted color designation information, executed is a process in which forming of an image with a color designated by the converted color designation information is replaced by forming of an image with the substitute color.

As described above, the search condition used in the search section 22 is associated with the information representing a spot color type of the color designation information, which is found based on this search condition. However, this exemplary embodiment is not limited thereto. For example, the search section 22 may output the color designation information found by the search process to the determination section 23 as it is. The determination section 23 may extract English characters that sequentially appear from the top of the input color designation information as the determination result (the information about the spot color type). In this example, for example, when the search section 22 outputs "DIC1s" as the search result, the determination section 23 extracts "DIC" as the English characters, which sequentially appear from the top, and obtains the "DIC" as the determination result. The search condition in this case may be such a condition as "an argument of "setcolor" is not represented by the process color".

Also, if color designation information designating a spot color having a type for which a conversion rule have not yet defined is contained in the color designation information found by the search process, it may be determined that such color designation information cannot be converted, and the unconverted color designation information may be output as it is. Alternatively, color designation information designated by a user (such color designation information may be stored in the storage section 12 as a non-conversion object) may not be converted irrespective of whether or not a conversion rule is defined for a corresponding spot color type, and the unconverted color designation information may be output as it is. In this case, the output section 25 may associate the unconverted color designation information with the substitute color information (input from the search section 22) used to represent the spot color designated by the color designation information, for registration into the image forming apparatus 2.

The information processing apparatus 1 according to the exemplary embodiment of the invention has the above-described configuration and operates as described below. Upon receipt of the image formation command from the client device 3, the information processing apparatus 1 of this exemplary embodiment starts a process shown in FIG. 5 to search for the color designation information relating to the spot color included in the input image formation command and the substitute color information corresponding thereto (S1). This search process may be executed, for example, by searching for a character string corresponding to a search condition that is designated in advance. The information processing apparatus 1 checks if the color designation information is found by the search operation in the process S1 (S2). If the color designation information is not found (for example, if there is no color designation information meeting the search condition or if the processes has been performed for all the color designation information), the information processing apparatus 1 terminates the process.

On the other hand, if it is determined determines in the process S2 that the color designation information is found by the search operation, the information processing apparatus 1 determines a spot color type of the color designation information found by the search operation (S3). Then, the information processing apparatus 1 checks if there is a conversion rule that is defined in advance for the determined spot color type, that is, check if the color designation information having the determined spot color type can be converted (S4). Here, if the color designation information can be converted, the information processing apparatus 1 further checks if a command for outputting the found color designation information as it is given in advance (S5). If it is determined in the process S4 that the color designation information cannot be converted or if it is determined in the process S5 that the command for outputting the found color designation information as it is given in advance, the information processing apparatus 1 checks if a character(s) that cannot be used are included in the found color designation information (S6). The characters that cannot be used are defined for each image forming apparatus 2. If it is determined in the process S6 that the characters that cannot be used are included in the color designation information, the information processing apparatus 1 eliminates the characters that cannot be used (S7). Then, the information processing apparatus 1 outputs the color designation information from which the characters that cannot be used are eliminated to the image forming apparatus 2 as it is, and registers the spot color (S8).

In the process of registering the spot color, the information processing apparatus 1 registers the substitute color information found in the process S1 and the color designation information in the image forming apparatus 2 in association with each other.

On the other hand, if it is determined in the process S6 that the characters that cannot be used are not included in the found color designation information, the information processing apparatus 1 jumps to the process S8 to output the color designation information to the image forming apparatus 2 as it is and register the spot color.

Also, if it is determined in the process S5 that the command for outputting the found color designation information as it is not given in advance, the information processing apparatus 1 reads the conversion rule relating to the spot color type determined in the process S3 from among the conversion rules, which are defined for the respective spot color types, and converts the color designation information found in the process S1 in accordance with the read conversion rule (S9). The converting operation of this step converts the color designation information into information conforming to the common expression rule. Then, the information processing apparatus 1 proceeds to the process S8, outputs the converted color designation information to the image forming apparatus 2 and registers the spot color (S8). Then, the information processing apparatus 1 returns to the process S1 to repeat the processes.

In the above description, the information processing apparatus 1 of this exemplary embodiment registers into the image forming apparatus 2 a value that is found as the substitute color information as it is. However, this exemplary embodiment is not limited thereto.

For example, if profile information representing a color reproducibility in the image forming apparatus 2 is set, the profile information includes parameters that associates the XYZ color system, which is a device independent color system, with device-dependent information (for example, CMYK values) representing a quantity of a coloring material. Therefore, information about the spot color to be registered in the image forming apparatus 2 may be converted into CMYK values that simulate the spot color, by using the parameters. In this case, since the conversion from a Lab value into an XYZ value is uniquely defined, the information processing apparatus 1 may convert an Lab value relating to the color designation information (for example, the converted color designation information) to be registered into an XYZ value, further convert the XYZ value into a CMYK value by using the profile information relating to the image forming apparatus 2, register the CMYK value obtained by the conversion and the color designation information to be registered in association with each other.

Furthermore, the profile information of the image forming apparatus 2 may be set in advance for each the spot color type.

Figure 5:
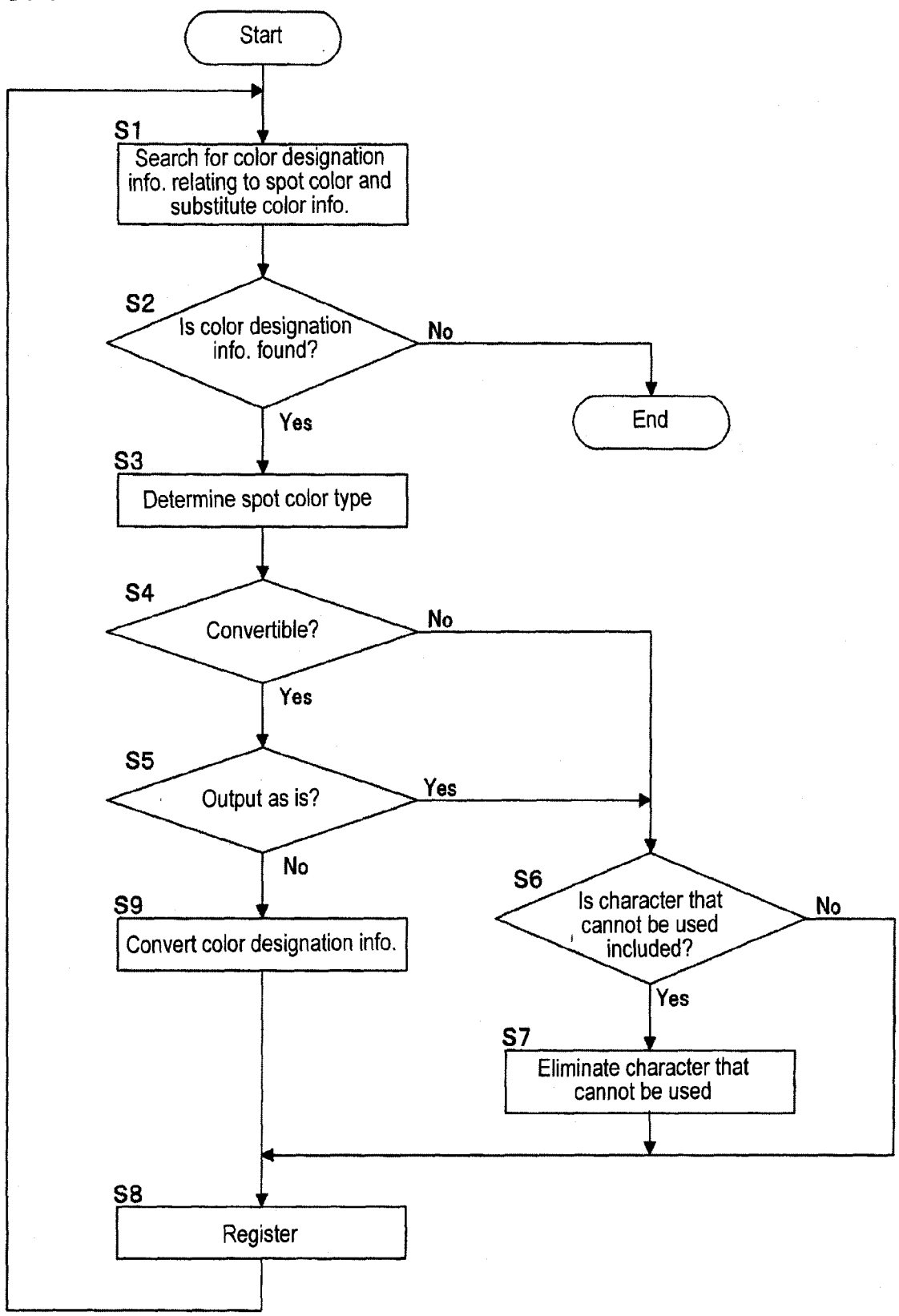
FIG. 5 is a flowchart showing an example of a process executed by the information processing apparatus according to the exemplary embodiment of the invention.

In this case, the information processing apparatus 1 obtains the above CMYK value by using the profile information, which is set for the spot color type determined in the process S3 of FIG. 5, among the plural pieces of profile information relating to the image forming apparatus 2.

Figure 6:
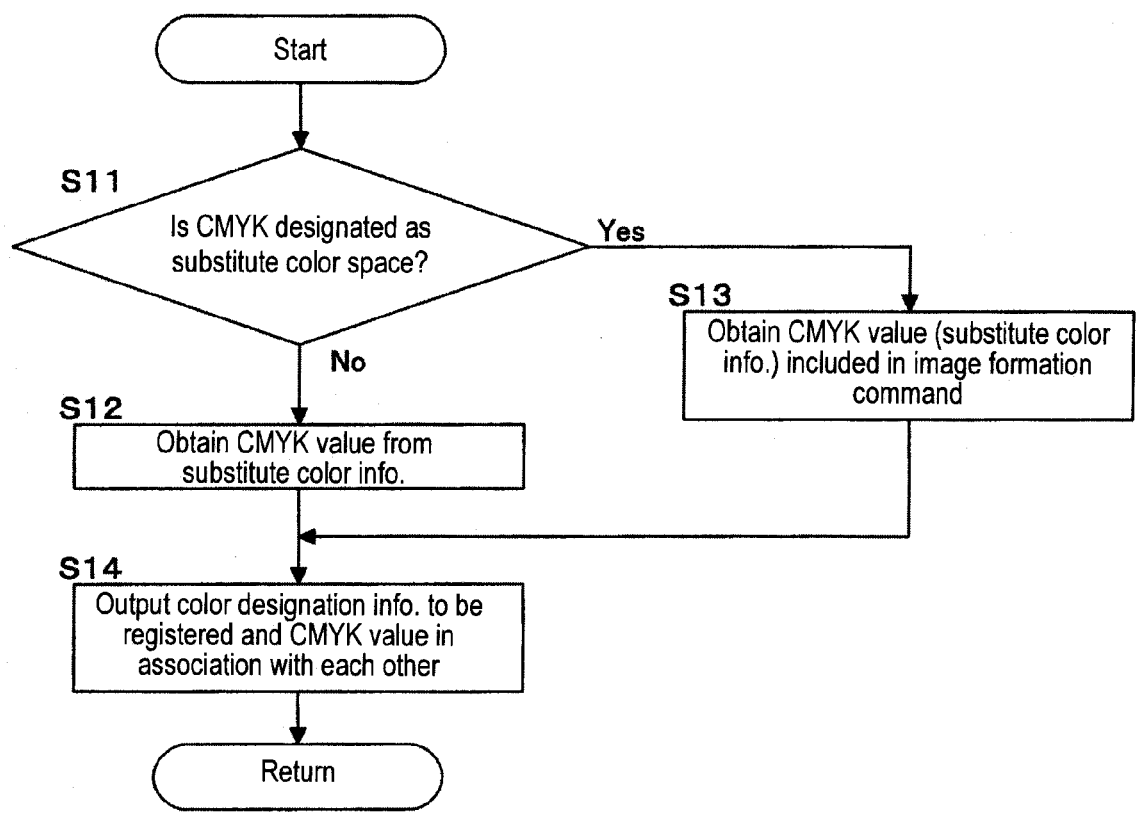
FIG. 6 is a flowchart showing an example of a registration process executed by the information processing apparatus according to the exemplary embodiment of the invention.

Further, in the process S8 of registering the spot color, as shown in FIG. 6, the information processing apparatus 1 checks if CMYK is designated as a substitute color space of the spot color in the input image formation command (S11). If CMYK is not designated, the information processing apparatus 1 may obtain a conversion profile of the image forming apparatus 2 and obtain a CMYK values based on the substitute color information, which is read from the image formation command correspondingly to the color designation information to be registered (S12). Then, the image processing apparatus 1 registers the color designation information to be registered and the CMYK value obtained in the process S12 in the image forming apparatus 2 in association with each other (S14).

Also, in this case, if CMYK is designated as the substitute color space of the spot color, the information processing apparatus 1 obtains information (substitute color designation information) about a substitute color (since the designated color space is CMYK, the information about the substitute color is represented by the CMYK values) included in the image formation command in relation to the color designation information found in the process S1 (S13). Then, the information processing apparatus 1 registers the obtained information and the color designation information to be registered in the image forming apparatus 2 in association with each other (S14).

What is claimed is:

1. An information processing apparatus comprising:
   a receiving unit that receives an image formation command to form an image;
   a search unit that searches the image formation command for color designation information that designates a spot color of the image formation command;
   a determination unit that determines a type of the color designation information to be a type of the spot color of the searched color designation information;
   a conversion unit that converts the color designation information into a common expression notation being interpretable for an image forming apparatus, based on a conversion rule that converts the type of the color designation information into the common expression notation; and
   an output unit that outputs the converted color designation information in the common expression notation.

2. The information processing apparatus according to claim 1, wherein the search unit searches the image formation command for substitute color designation information that is used when the spot color designated by the color designation information is substituted by a use quantity of plural coloring materials as well as the color designation information that designates the specific color information.

3. The information processing apparatus according to claim 1, wherein the type of the spot color comprises one of a Dainippon Ink and Chemicals (DIC) spot color, a Toyo spot color, and a Pantone spot color.

4. The information processing apparatus according to claim 3, wherein the conversion unit converts the color designation information into the common expression notation by changing a formatting of the one of the DIC spot color, the Toyo spot color, and the Pantone spot color expressed in the color designation information.

5. The information processing apparatus according to claim 1, wherein the type of the spot color comprises a type of color chart.

6. An information processing method comprising:
   receiving an image formation command to form an image;
   searching the image formation command for color designation information that designates a spot color of the image formation command;
   determining a type of the color designation information to be a type of the spot color of the searched color designation information;
   converting the color designation information into a common expression notation being interpretable for an image forming apparatus, based on a conversion rule that converts the type of the color designation information into the common expression notation; and
   outputting the converted color designation information in the common expression notation.

7. The information processing method according to claim 6, wherein the searching comprises searching the image formation command for substitute color designation information that is used when the spot color designated by the color designation information is substituted by a use quantity of plural coloring materials as well as the color designation information that designates the specific color information.

8. The information processing method according to claim 6, wherein the type of the spot color comprises one of a Dainippon Ink and Chemicals (DIC) spot color, a Toyo spot color, and a Pantone spot color.

9. The information processing method according to claim 8, wherein the converting comprises converting the color designation information into the common expression notation by changing a formatting of the one of the DIC spot color, the Toyo spot color, and the Pantone spot color expressed in the color designation information.

10. The information processing method according to claim 6, wherein the type of the spot color comprises a type of color chart.

11. A non-transitory computer-readable medium storing a program that causes a computer to execute information processing, the information processing comprising:
    receiving an image formation command to form an image;
    searching the image formation command for color designation information that designates a spot color of the image formation command;
    determining a type of the color designation information to be a type of the spot color of the searched color designation information;
    converting the color designation information into a common expression notation being interpretable for an image forming apparatus, based on a conversion rule that converts the type of the color designation information into the common expression notation; and
    outputting the converted color designation information in the common expression notation.

12. The non-transitory computer-readable medium according to claim 11, wherein the searching comprises searching the image formation command for substitute color designation information that is used when the spot color designated by the color designation information is substituted by a use quantity of plural coloring materials as well as the color designation information that designates the specific color information.

13. The non-transitory computer-readable medium according to claim 11, wherein the type of the spot color comprises one of a Dainippon Ink and Chemicals (DIC) spot color, a Toyo spot color, and a Pantone spot color.

14. The non-transitory computer-readable medium according to claim 13, wherein the converting comprises converting the color designation information into the common expression notation by changing a formatting of the one of the DIC spot color, the Toyo spot color, and the Pantone spot color expressed in the color designation information.

15. The non-transitory computer-readable medium according to claim 11, wherein the type of the spot color comprises a type of color chart.

* * * * *